COMMUNICATION SYSTEM HAVING LEVEL CONTROL MEANS FOR REPEATERS CONNECTED ALONG A TRANSMISSION CABLE

Filed Feb. 10, 1965

INVENTOR.
WILLEM HERMES
JOSEPH F. LANSU
JAN VERHAGEN
BY
Frank R. Trifari
AGENT

United States Patent Office 3,414,688

Patented Dec. 3, 1968

3,414,688

COMMUNICATION SYSTEM HAVING LEVEL CONTROL MEANS FOR REPEATERS CONNECTED ALONG A TRANSMISSION CABLE

Willem Hermes, Joseph Frederik Lansu, and Jan Verhagen, Hilversum, Netherlands, assignors to North American Philips Company, Inc., New York, N.Y., a corporation of Delaware Filed Feb. 10, 1965, Ser. No. 431,642

Claims priority, application Netherlands, Feb. 12, 1964, 6401183

15 Claims. (Cl. 179—170)

ABSTRACT OF THE DISCLOSURE

A level control system for a communication system of the type having a transmitter station and a receiver station interconnected by a transmission cable which includes a plurality of repeaters. A pilot receiver in the receiver station produces a direct current signal responsive to the level of a received pilot signal, and this control signal is employed to adjust the level of some of the repeaters, by way of level control impedances, to produce a pilot signal at the receiver of opposite polarity (i.e. so that the received pilot signal differs from its nominal level but in the opposite direction). The control signal is also employed to control the receiver station to adjust the received pilot signal to its nominal level.

Figures 1, 2, 3, 4, 5:
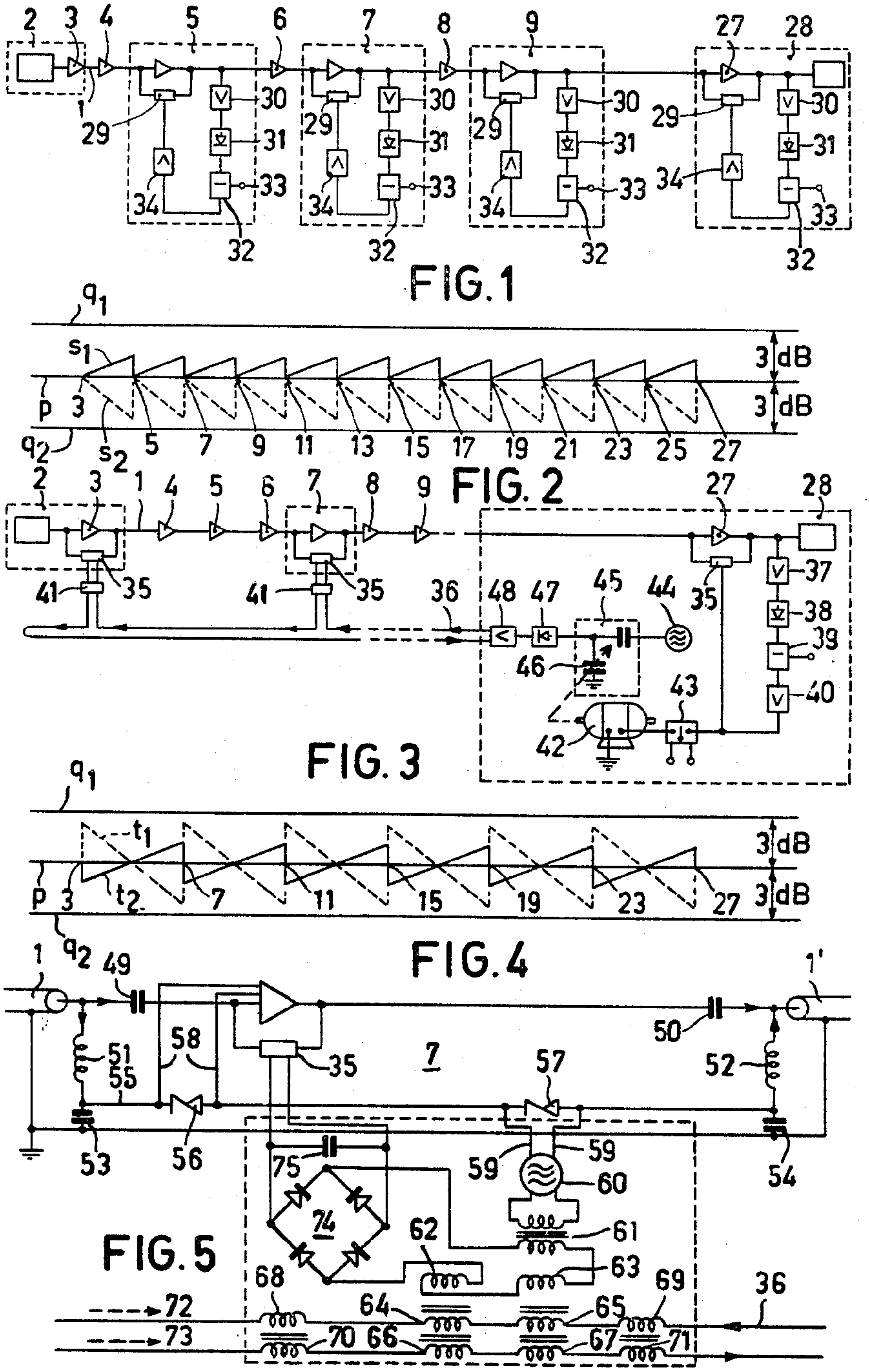

This invention relates to communication systems for the transmission of signals through a transmission cable via one or more repeater stations to a final station, at least one repeater station and also the final station including a level-control device having an adjustable level-control impedance to be controlled by a level-control signal, which impedance is controlled in magnitude by a co-transmitted pilot signal, intended to be used, for example, for the transmission of carrier telephony signals, television signals and the like.

In order to satisfy the very high requirements imposed on the quality of transmission in such communication systems, the repeater stations provided with level-control devices have to ensure that the deviations in level of the transmitted signals with respect to the nominal signal level, caused substantially by variations in damping of the transmission cable, lie within two limiting values along the whole transmission cable. More particularly if the signal level in the repeater stations is unduly high there is a risk of intermodulation and excess control whereas, if the signal level is unduly low, the influence of noise voltages is increased.

Thus in the signal transmission through large distances, for example, through several hundreds of kilometres, use is made of a large number of repeater stations including level controls to fulfil the requirement imposed, but such communication equipment, apart from its complicated structure, has the result that an instable output level occurs in the output circuit of the final station (so-called jittering) due to the cooperation of the control equipments in the repeater stations. In fact, the level control in a repeater station usually influences the level-control device in the succeeding repeater stations, resulting in an instable output level of the communication system.

An object of the invention is to provide another conception of a communication system of the kind mentioned in the preamble in which a stable output level of the final station is obtained together with a considerable simplification of the communication system.

The communication system according to the invention is characterized in that the adjustable level-control impedance in the level-control device of the repeater station of stations preceding the final station is controlled through a level control line by a pilot receiver included in the final station and causing a deviation in level of the output signal from the repeater station or stations preceding the final station having a polarity opposite to that of the deviation in level at the final station, whilst the level-control device of the final station includes an adjustable level-control impedance which brings the output signal of the final station substantially to nominal level by control of the pilot receiver associated with the final station.

In order that the invention may be readily carried into effect, it will now be described in detail, by way of example, with reference to the accompanying diagrammatic drawing, in which:

FIGURE 1 shows a communication system of known type and

FIGURE 2, an associated level diagram;

FIGURE 3 shows the communication system according to the invention and

FIGURE 4, the associated level diagram;

FIGURE 5 shows in greater detail one embodiment of an intermediate repeater station as used in a communication system according to the invention.

The transistorized carrier telephony system of known type shown in FIGURE 1 is designed for carrier telephony traffic along a coaxial cable 1, for example, for the transmission of 960 speech signals in the frequency band from 60 kc./s. to 4 mc./s. In the illustrated carrier telephone connection the carrier telephone signals provided by a first station 2 and an associated first repeater station 3 are applied through intermediate repeater stations 4, 5, 6, 7, 8, 9 . . . 26 to a final station 28 and an associated final repeater station 27. The powering of the intermediate repeater stations 4 to 26, which is not shown, is effected in known manner by means of a direct supply voltage which is applied, for example, from the first station 2, together with the carrier telephone signals, to the coaxial cable 1.

To compensate for variations in the level of the transmitting signals, which are caused substantially by damping variations in the transmission cable resulting from variations in temperature, each of the intermediate repeater stations 5, 7, 9, . . . and the final repeater station 27 include a level-control device constituted by a temperature-dependent resistor, for example in the form of a thermistor or a small incandescent lamp, included in a negative feedback circuit 29 of each of the repeater stations 5, 7, 9, . . . , a level ocntrol current serving for level control being supplied as a heating current to the filament of the incandescent lamp. The intermediate repeater stations 4, 6, 8, . . . 26 do not include level-control devices.

For the level control of the repeater stations 5, 7, 9 . . . 27 a pilot signal is transmitted, together with the carrier telephone signals, along the coaxial cable 1 and applied in each of the repeater stations 5, 7, 9, . . . to a pilot receiver connected to the output of each of the repeater stations 5, 7, 9, . . . for producing a level-control signal serving for level control. More particularly the pilot receiver is constituted by the cascade connection of a selective pilot amplifier 30 tuned to the pilot frequency, followed by a rectifying device 31 and an amplitude comparison device 32 for amplitude comparison of the output voltage from the rectifying device 31 with a constant reference voltage originating from a terminal 33 the output voltage of which provides, after amplification in a direct-current amplifier 34, the level control sigal.

By control of the negative feedback factor of the repeater stations 5, 7, 9, . . . 27 an accurate level control is thus obtained in the described carrier telephone system.

For example, an increase in the level of the pilot signal causes a corresponding increase in the negative feedback factor, resulting in a decrease in amplification which counteracts the increase in level, whereas a decrease in the level of the pilot signal results in an increase in amplification which counteracts the decrease in level.

The operation of the described carrier telephony system will now be explained in detail, with reference to the level diagram of FIGURE 2 in which the straight line $p$ indicates the nominal level of the pilot signal and the lines $q_1$, $q_2$ located one on each side of the nominal level of the pilot signal represents the limiting values of the pilot signal level. These limiting values lie, for example, at 3 db from the nominal level of the pilot signal. The distances between the controlled repeater stations indicated by 5, 7, 9, . . . 27 in FIGURE 2 are chosen to be such that the deviations in pilot signal occurring along the whole transmission cable 1 lie within the two limiting values $q_1$ and $q_2$.

If, in the described carrier telephony system, a variation in the damping of the cable occurs, for example, a reduction of damping caused by a decrease in the temperature of the cable, the level of the pilot signal along the carrier telephone connection will thus increase, resulting in a corresponding increase in the output current of the pilot receivers 30 to 34 which, by control of the negative feedback factors of the associated repeater stations 5, 7, 9 . . . 27, restore the output level of these repeater stations substantially to nominal level. For illustrative purposes the line $s_1$ in FIGURE 2 shows the pilot signal upon a decrease in damping resulting from a decrease in the temperature of the cable, for example, at the temperature $T_1$ and the broken line $s_2$ shows the pilot signal level upon an increase in the temperature of the cable, for example, at a temperature $T_2$. As may be seen from the figure, the level of the pilot signal is in each case restored to nominal level at the repeater station, 5, 7, 9, . . . 27 which include level-control devices.

It is thus ensured that the level of the pilot signal along the whole carrier telephone connection nowhere exceeds the limiting values $q_1$ $q_2$ due to the cascade connection of the repeater stations 5, 7, 9, . . . 27 including level controls, but this cascade connection, on the other hand, results in an instable output level in the final station 28 due to the cooperation of the control equipments in the various repeater stations 5, 7, 9, . . . 27. In fact, if level control occurs in one of the repeater stations, for example, in repeater station 5, the resulting variation in the level of the pilot signal will bring about a level control through the succeeding pilot receivers in the associated repeater stations 7, 9, . . . 27, which in the final station 28 gives rise to a decay phenomenon the magnitude and duration of which are determined by the number of the repeater stations including level control.

In order to obtain a considerable simplification in the structure and equipment, together with a stable output level of the final station 28, the carrier telephony system according to the invention is designed in the manner shown in FIGURE 3. For comparison of the arrangement according to the invention with the known arrangement of FIGURE 1, the various stations are indicated by the same reference numerals in FIGURE 3.

In the arrangement of FIGURE 3 the intermediate repeater stations 7, 11, 15, . . . 23 and the final repeater station 27, but also first station 3 of the carrier telephony system include a level control device constituted, as previously described with reference to FIGURE 1, by a temperature-dependent resistor included in a negative feedback circuit 35. In further contrast with the arrangement of FIGURE 1, the temperature-dependent resistors in the negative feedback circuits 35 of the intermediate repeater stations 3, 7, . . . 23 are connected to a common level-control line 36 which is fed with a level control signal provided by a pilot receiver connected to the output circuit of the final repeater station 27 of the final station 28, which pilot receiver causes a deviation in level of the output signal from the repeater stations 2, 7, . . . 23 preceding the final station 28 having a polarity opposite to that of the deviation in level of the input signal of the final station 28, whilst the level control device 35 of the final repeater station 27 restores the output signal to the nominal level. The pilot receiver in the final station is designed in the usual manner and includes successively a selective pilot amplifier 37, a rectifier 38, an amplitude comparison device 39 and an amplifier 40 from which a level control signal serving for level control is derived for the various repeater stations 3, 7, . . . 23, 27. The level control signal for level control of the repeater stations 3, 7, . . . 23 may be transmitted through the common level control line 36 in various ways, for example, by frequency modulation, pulse modulation or the like, but because of the simplicity in equipment and the comparatively great damping of the level control line 36 with respect to alternating voltages, which is, for example, 1 db per kilometer length for an alternating voltage of 1000 c./s. it is advantageous to transmit the level control signal as a direct level control current. In fact, not only the damping of the cable is considerably lower, but the advantage is then obtained that, by connecting the adjustable level-control impedances of the level control devices of the repeater stations 3, 7, . . . 23 in series-combination to the level control line 36, the level control in the repeater stations 3, 7, . . . 23 is substantially not influenced by the control line 36 since the cross-dissipation impedance of the level control line 36 is very high with respect to direct current, for example, 1000 megohms per kilometre.

It is in this case advantageous to supply the direct level-control current, instead of directly as a heating current to the temperature-dependent resistors of the stations 3, 7, . . . 23, through a direct-current converter 41, since in this arrangement the direct level-control current need provide only the comparatively low control power of the direct-current converter 41. The total power required for the level control of all the repeater stations is, for example, 4 watts.

The carrier telephony system according to the invention will now be described in detail with reference to the diagram of FIGURE 4.

If in the carrier telephony system so far described, when starting from the nominal level, the damping of the cable decreases due to a decrease in the temperature thereof, the resulting increase in pilot signal in the pilot receiver in the final repeater station 27 will cause an increase in the direct level-control current along the common level control line 36, which increase in direct level-control current causes an increase in the negative feedback factor, through the direct-current converters 41 in the repeater stations 3, 7, . . . 23 preceding the final station 28, which is such that in the output circuit of the repeater stations 3, 7, . . 23 a deviation in level occurs opposite to the increase in level in the final station 28, whilst the level is not restored to its nominal level until by the level-control device in the finall station 28. Thus, due to the level control employed, a decrease in level with respect to the nominal level will occur in the output cricuits of the stations 3, 7, . . . 23 preceding the final station 28 and the level diagram of the described carrier telephony system will exhibit, at the same cable temperature $T_1$ as in the level diagram of FIGURE 2 relating to the known carrier telephony system, the variation indicated by the broken line $t_1$ of FIGURE 4, where, as in FIGURE 2, the straight line $p$ indicates the nominal level and the straight lines $q_1$, $q_2$ represent the limiting values of the pilot signal which must not be exceeded.

For illustrative purposes the straight line $t_2$ of FIGURE 4 shows the level diagram if, due to an increase in damping resulting from an increase in the temperature of the cable, the incoming signal of the final station exhibits an increase in level, for example, as in FIGURE 2 at the temperature $T_2$. In practice, the deviation in level occurring is converted by the level control in the repeater stations 7, 11, . . . 23 into a deviation of opposite polarity but of equal magnitude.

Quite different from the conception of the level control of the known carrier telephony system of FIGURE 1, in which the level is restored to its nominal value in the stations including level control devices, in the arrangement according to the invention the situation is such that in the stations preceding the final station 28, beginning already with the first station 3, the level control used causes a deviation in level but of opposite polarity to the deviation in level of the final repeater station 27. The number of repeater stations including level control is thus reduced by nearly a factor of 2 without exceeding the limiting values $q_1$, $q_2$ of the pilot signal and hence without detracting from the quality of transmission, as may appear from a comparison of the level diagrams $s_1$, $s_2$ of FIGURE 2 with the level diagrams $t_1$, $t_2$ of FIGURE 4. More particularly the known arrangement of FIGURE 1 utilises 12 controlled repeater stations whereas in the arrangement according to the invention only 7 repeater stations are present, which are furthermore simpler of construction.

Together with the resulting remarkable saving in equipment without influencing the quality of transmission, in the arrangement according to the invention unwanted variations in level at the output of the final station 28 resulting from cooperation of the control equipments in the various repeater stations 3, 7 . . . 23 are restricted to a high extent since all the control devices in the repeater stations 3, 7 . . . 23 are controlled through the common control line 36 by the pilot receiver in the final station 28. In order that, upon level control, the level control device of final station 28 can follow the variations in level caused by the preceding stations 3, 7 . . . 23 it is important for the rate of control of the final repeater station 27 to be made higher than that of the preceding repeater stations 3, 7 . . . 23.

To this end, the direct level-control current derived from the output amplifier 40 of the pilot receiver is not used directly for the level control of the stations 3, 7 . . . 23 but rather obtained with the use of a regulating motor 42 which at the same time acts as a memory and is controlled by a control device 43 connected to the output circuit of the amplifier 40 and comprising a maximum relay and a minimum relay as shown diagrammatically in the figure. In fact, if the output voltage of amplifier 40 exceeds a certain limiting value, the maximum relay responds and the regulating motor 42 rotates in one direction, whereas if the output voltage of amplifier 40 decreases below a certain limiting value, the minimum relay responds and the regulating motor 42 rotates in the other direction. To this end, in the embodiment shown, the shaft of the regulating motor 42 is connected to a variable capacitor 46 of an adjustable voltage divider 45 in the output circuit of a local oscillator 44, the alternating voltage derived from the adjustable voltage divider 45, after rectification in a rectifier 47, being applied to an amplifier 48 which provides, through the control line 36, the level control current for the stations 3, 7 . . . 23.

Thus the speed of variation of the control current supplied to the control line 36 and hence the rate of control of the level control devices in the repeater stations 3, 7 . . . 23 is reduced considerably so that the level variations in the repeater stations 3, 7 . . . 23 caused upon level control can be followed by the level-control device in the final station 28, so that the variation in pilot signal in the final repeater station remains constant below 0.1 db. In the described embodiment in which respectively the amplifier preceding the final repeater 27 can be arranged as the first repeater 3, the rate of control of the stations 3, 7 . . . 23 is, for example, 1 db/min. and that of the final repeater station 27 is 1 db/sec. If desired, the level control signal flowing through line 36 may also be used for the level control of repeater stations included in parallel lines.

In this connection it should be noted that, instead of from oscillator 44, the level control current can be derived from a direct-current source and a voltage divider constituted by resistors and connected to the output circuit of the said source, but in this case the risk of crackling contacts is involved.

FIGURE 5 shows in greater detail the structure of an intermediate repeater station, for example, of repeater station 7. Elements corresponding to those of FIGURE 3 are indicated by the same reference numerals.

In this arrangement the carrier telephony signals incoming through the coaxial cable 1, after being amplified in the transistor amplifier of the intermediate repeater station 7, are applied to a coaxial output cable 1', the direct supply voltage for repeater station 7 also being led through the coaxial line 1, 1'. To separate the carrier telephony signals from the direct supply voltage, separating filters are provided at the output of the coaxial cable 1 and at the input of the coaxial cable 1', said filters being constituted by series-capacitors 49, 50 and the series-combinations of cores 51, 52 and capacitors 53, 54, a supply voltage line 55 for the repeater station being provided between the common points of the coils 51, 52 and the capacitors 53, 54. The supply voltages for the transistor amplifier and the direct-current converter 41 serving for level control are derived from two Zener diodes 56, 57, included in series in the supply voltage line 55, and applied through supply voltage leads 58, 59 to the transistor amplifier and the direct-current converter 41.

In the embodiment shown, the direct-current converter 41 includes an oscillator 60 which is connected through a transformer 61 to the series-combination of two oppositely wound coils 62, 63 each having a saturable ferromagnetic core, this circuit also having connected to it a rectifier 74 and a smoothing capacitor 75 from which the direct current serving for level control is derived.

The coils 62, 63 include premagnetizing windings 64, 65, respectively in the forward direction and second premagnetizing windings 66, 67, respectively, in the return direction of the level control line 36, which premagnetizing windings 64, 65 and 66, 67 are traversed in the forward and return conductors by the direct level-control current flowing through the level control line 36 in the same direction of winding. To ensure that the oscillator 60 is decoupled for high frequency from the level control line, high-frequency choke coils 68, 69 70, 71 are arranged in series with the premagnetizing windings 64, 65, 66, 67.

In the described arrangement the coils 62, 63 and their associated premagnetizing windings 64, 66, and 65, 67 respectively fulfil the function of a double-acting limiter the limiting level of which is determined by the magnitude of the direct level-control current flowing through the level control line 36. More particularly the direct level-control current flowing through the premagnetizing windings 64, 65, 66, 67 causes a saturation in the ferromagnetic cores of the coils and hence the impedance of the circuit extending from the transformer 61 to the rectifier 64 has a very low value, whilst each time at the instants when the instantaneous value of the oscillator current induced in the circuit eliminates the premagnetisation caused by the premagnetizing windings, the ferromagnetic cores of the coils 62, 63 are brought from the saturated state to the unsaturated state so that the impedance of the circuit extending from the transformer 61 to the recifier 64 acquires a very high value and a further increase of the induced current in the circuit is counteracted. Rectification in a rectifier 74 and a smoothing capacitor 75 provides the heating current of the temperature-dependent resistor serving for level control, which heating current varies in proportion with the magnitude of the direct level-control current flowing through the control line 36. It is thus ensured that the power for the control of the direct-current converter 41 by means of the direct control current flowing through the control line 36 is much lower, for example, by a factor of 10 lower than the power for heating the temperature-dependent resistor which is provided by the oscillator 60.

Together with the required comparatively low control power of the direct level-control current flowing through the control line 36 and simplicity of construction, the two premagnetizing windings 64, 66 and 65, 67 included in the forward and return conductors of the level control line 36 for the two coils 62, 63 afford the advantage that the level control device is largely independent of longitudinal currents or voltages, indicated by dashed arrows 72, 73, which may be induced in the level control line 36 by heavy electrical traction engines or stroke of lightning. To avoid in this case flash-over phenomena, the galvanic separation of the level control line 36 from the remaining portion of the transmission equipment is favourable in this respect.

It should be noted here that it is fundamentally possible to bring about the level control by means of a level control signal through the transmission cable, for example, by modulation of the supply voltage, but the level control through the separate control line is preferable inter alia because of the simplicity of equipment, greater reliability of operation and the like.

What is claimed is:

1. In a transmission system of the type including a transmitting station, a plurality of repeater stations, and a final station interconnected in that order by a transmission cable, means for maintaining the level of signals on said cable between predetermined maximum and minimum levels on opposite sides of a predetermined nominal level, said means comprising means for producing a control signal that varies with thermally responsive level deviation of signals on said cable from said nominal level in one direction, at least one of said repeater stations comprising level control means for controlling the amplification of the respective station, and means applying said control signal to said level control means with a polarity and amplitude to vary the amplification of said respective station to change the level of signals on said cable to deviate in the opposite direction with respect to said nominal level, said final station comprising amplification control means connected to said means for producing a control signal to control the amplification in said final station to adjust the level of signals at the output of said final station to said nominal level.

2. In a signal transmission system of the type having a transmitting station, a plurality of repeating stations, and a final station interconnected in that order by a transmission cable, whereby variations in temperature of said cable effects variation in attenuation of signals propagating along said cable, the improvement comprising means for maintaining the level of signals on said cable between predetermined maximum and minimum levels on opposite sides of a given nominal level, said means comprising level control means in at least one of said repeater stations for controlling the amplification of the respective station, means producing a control signal that varies with the thermally produced attenuation of said cable at a point in said system, means applying said control signal to said level control means with a polarity and amplitude to adjust the amplification of said respective station to produce signal level deviation at the output of said respective station substantially opposite the signal level deviation at the input of said final station with respect to said nominal level, and amplification control means in said final station connected to said means for producing a control signal to control the amplification in said final station to adjust the signal output level of said final station to said nominal level.

3. The transmission system of claim 2 in which said transmitting station includes control means connected to said means for producing a control signal to control the output level of said transmitting station to deviate from said nominal level opposite to said level deviation at the input of said final station.

4. In a signal transmission system of the type having a transmitting station, a plurality of repeating stations, and a final station interconnected in that order by a transmission cable, wherein said transmitting station includes means for applying pilot signals to said cable and said final station includes a pilot signal receiver for producing a control signal responsive to the amplitude of said pilot signal at said final station, and at least one of said repeater stations comprises first level control means for controlling the amplification of the respective station; wherein the improvement comprises means applying said control signal to said level control means with an amplitude and polarity to adjust the signal output of said respective station to a level opposite to the signal input level of said final station with respect to a predetermined nominal signal level, second level control means in said final station for controlling the output signal amplitude of said final station, and means applying said control signal to said second level control means for adjusting the output signal level of said final station to said nominal level.

5. The system of claim 4 wherein said transmitting station comprises a third level control means for controlling the signal output amplitude of said transmitting station, and means for applying said control signal to said third level control means with a polarity and amplitude to adjust the output of said transmitting station to a level opposite to the signal input level of said final sation with respect to said nominal level.

6. The system of claim 4 wherein said first level control means comprises a level control impedance means having an impedance responsive to said control signal for varying the amplification of said respective station.

7. The system of claim 4 comprising a level control line separate from said cable for applying said control signal from said final station to said first level control means, and said control signal is a direct current signal.

8. The system of claim 7 comprising direct current conversion means for connecting said level control line to said level control means.

9. The system of claim 8 in which said conversion means comprises an oscillator, a rectifier, first and second transformers with saturable core, each transformer having first and second premagnetizing windings connected in the forward and return lines of said level control line respectively, and third windings connected in opposition between said oscillator and said rectifier, and means connecting the output of said rectifier to said first level control means.

10. The system of claim 9 comprising decoupling choke coils connected in series in said level control line.

11. The system of claim 7 comprising regulating motor means, means connecting said regulating motor means to the output of said pilot signal receiver, an adjustable source of voltage connected to said level control line, and means coupling said motor means to said source for controlling said direct current signal.

12. The system of claim 11 wherein said source of voltage includes an adjustable voltage divider, comprising means mechanically coupling the shaft of said motor means to said voltage divider.

13. The system of claim 11 wherein said source comprises an oscillator and a rectifier connected together by an adjustable capacitive voltage divider, comprising means coupling the shaft of said motor means to said voltage divider.

14. The system of claim 11 wherein said means connecting said regulating motor means to the output of said pilot signal receiver comprises maximum-minimum relay means.

15. In a signal transmission system of the type having a transmitting station, a plurality of repeater stations, and a final station interconnected in that order by a transmission cable, wherein said transmitter station includes means for applying pilot signals to said cable and said final station includes a pilot signal receiver for producing a control signal responsive to the amplitudes of pilot signals at said receiver; the improvement wherein said transmitting station, at least one repeater station, and said final station comprises first, second and third level control means respectively for controlling the amplification of the respective station, a level control line serially connected to said first and second level control means, means applying said control signal to said level control line whereby the amplification of said transmitting and one repeater station is adjusted so that their respective outputs have opposite levels than the input level of said final station with respect to a predetermined nominal level, and means applying said control signal to said third level control means for adjusting the amplification of said final station whereby the output of said final station is adjusted to said nominal level.

References Cited

UNITED STATES PATENTS 2,102,138 12/1937 Strigby ______________ 333—16

FOREIGN PATENTS 1,144,773 3/1963 Germany.

KATHLEEN H. CLAFFY, *Primary Examiner.*

R. LINN, *Assistant Examiner.*